(12) United States Patent
Thomas et al.

(10) Patent No.: US 9,021,344 B2
(45) Date of Patent: Apr. 28, 2015

(54) OFF-LINE GRAPHICAL USER INTERFACE SYSTEM AND METHOD FOR THREE-DIMENSIONAL MEASUREMENT

(75) Inventors: Bruce L. Thomas, Toano, VA (US); Robert J. Salerno, Mount Tremper, NY (US); Joseph M. Calkins, Lanexa, VA (US)

(73) Assignee: New River Kinematics, Inc., Williamsburg, VA (US)

( * ) Notice: Subject to any disclaimer, the term of this patent is extended or adjusted under 35 U.S.C. 154(b) by 895 days.

(21) Appl. No.: 12/807,213

(22) Filed: Aug. 31, 2010

(65) Prior Publication Data

US 2012/0050255 A1    Mar. 1, 2012

(51) Int. Cl.
*G06F 3/048*    (2013.01)
*G01B 21/04*    (2006.01)
*G05B 19/409*   (2006.01)

(52) U.S. Cl.
CPC ............ *G01B 21/047* (2013.01); *G05B 19/409* (2013.01); *G05B 2219/32128* (2013.01); *G05B 2219/37193* (2013.01)

(58) Field of Classification Search
CPC .................................. G01C 9/00; G06F 3/048
USPC ........................................................ 715/810
See application file for complete search history.

(56) References Cited

U.S. PATENT DOCUMENTS

| 5,724,264 | A  | * | 3/1998  | Rosenberg et al. | 702/152 |
| 6,408,253 | B2 | * | 6/2002  | Rosenberg et al. | 702/95  |
| 6,612,044 | B2 | * | 9/2003  | Raab et al.      | 33/503  |
| 7,693,325 | B2 | * | 4/2010  | Pulla et al.     | 382/154 |
| 2008/0010593 | A1 | * | 1/2008 | Uusitalo et al. | 715/702 |
| 2010/0325907 | A1 | * | 12/2010 | Tait           | 33/503  |

OTHER PUBLICATIONS

J.B. Liao et al. "A coordinate measuring machine vision system" (Computers in Industry, vol. 38, Issue 3, Apr. 1999, p. 239-248)*

* cited by examiner

*Primary Examiner* — Jennifer To
*Assistant Examiner* — Xuyang Xia
(74) *Attorney, Agent, or Firm* — Peter J. Van Bergen

(57) ABSTRACT

An off-line graphical user interface (GUI) system and method provide for input control of a three-dimensional coordinate measuring machine (CMM) using the CMM's probe. A GUI image presents a plurality of control operation icons associated with the CMM. A controller uses the CMM to locate the GUI image in a coordinate system of the CMM. The controller defines coordinates of the control operation icons and references the coordinates to the coordinate system of the CMM. The controller also defines a function activation zone associated with each of the control operation icons. Each function activation zone defines criteria relating movement of the CMM's probe therein to the operational function of the CMM associated with one of the control operation icons corresponding thereto. Satisfaction of the criteria causes the operational function of the CMM to be carried out by the CMM.

36 Claims, 7 Drawing Sheets

OFF-LINE GRAPHICAL USER INTERFACE SYSTEM AND METHOD FOR THREE-DIMENSIONAL MEASUREMENT

FIELD OF THE INVENTION

The invention relates generally to machine control via a graphical user interface, and more particularly to a system and method that uses an off-line graphical user interface for control of, for example, three-dimensional coordinate measuring machines.

BACKGROUND OF THE INVENTION

Three-dimensional "coordinate measuring machines" (CMM) are well-known in the field of metrology. A CMM allows a user to precisely measure an object in three-dimensional space by precisely recording a number of points on the object. One type of CMM is known as a "portable CMM" since it can be readily transported/set-up where needed. A portable CMM includes a probe that is hand-held and manipulated by a user. In a measurement operation, the user touches the probe to a number of points on an object being measured. The three-dimensional coordinates of the points are recorded on a computer coupled to the probe in a hard-wired or wireless fashion.

Between one or more probe touches, the user must use the computer to identify how the probe is about to be used, i.e., identify the operational mode of the probe. For example, if the user is about to measure points on a circular portion of an object, the user must "tell" the CMM's computer that the next series of probe touches should be fit to a circle. Currently, the user supplies the CMM's computer with an operational mode selection via a mouse of keyboard coupled to the CMM's computer. That is, the user generally releases the probe, sets it down, etc., and then uses his hands to make his mode selection using the CMM's mouse/keyboard. The user must then pick up the probe and perform his one or more measurement "touches" associated with the mode selection. To change modes (or calibrate the CMM, edit settings such as instrument sampling rate, etc.), the user must repeat the "probe release, computer input, probe pick-up" sequence. Over the course of a typical measurement operation, this back-and-forth handling can be time-consuming and tedious.

SUMMARY OF THE INVENTION

Accordingly, it is an object of the present invention to provide a system and method that improves a user's efficiency when operating a portable CMM.

Another object of the present invention is to provide a system and method that minimizes back-and-forth use of a CMM's computer input devices and the CMM's probe.

Other objects and advantages of the present invention will become more obvious hereinafter in the specification and drawings.

In accordance with the present invention, an off-line graphical user interface (GUI) system and method provide for input control of a three-dimensional coordinate measuring machine (CMM) using the CMM's probe. A GUI image is displayed on a platform. The GUI image exists in at least two dimensions and presents a plurality of control operation icons associated with the CMM. Each control operation icon is indicative of an operational function of the CMM. A controller, interfacing with the CMM, uses the CMM to locate the GUI image in a coordinate system of the CMM. The controller defines coordinates of the control operation icons and references the coordinates to the coordinate system of the CMM. The controller also defines a function activation zone associated with each of the control operation icons. Each function activation zone extends from one of the control operation icons associated therewith and is referenced to the coordinate system of the CMM. Each function activation zone defines criteria relating movement of the CMM's probe therein to the operational function of the CMM associated with one of the control operation icons corresponding thereto. Satisfaction of the criteria causes the operational function of the CMM to be carried out by the CMM.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
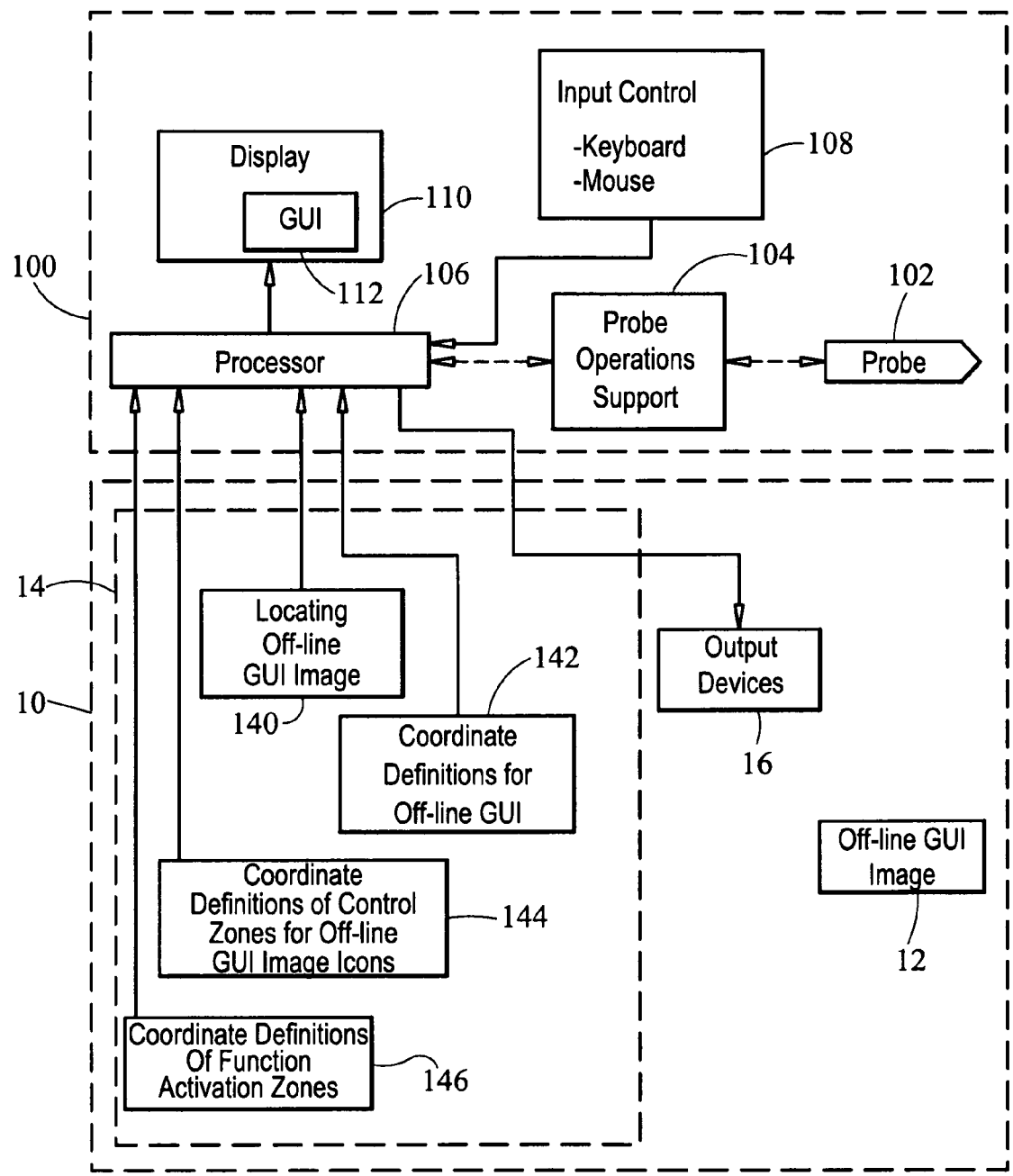
FIG. 1 is a block diagram of an off-line graphical user interface (GUI) system for use with a three-dimensional coordinate measuring machine (CMM) in accordance with an embodiment of the present invention.

Referring now to the drawings and more particularly to FIG. 1, an off-line graphical user interface (GUI) system in accordance with the present invention is illustrated and is contained within dashed-line box referenced by numeral 10. Off-line GUI system 10 is used in conjunction with a conventional three-dimensional coordinate measuring machine (CMM) 100, the particular design of which is not a limitation of the present invention. Indeed, a great advantage of the present invention is its ability to be used with a variety of different types of CMMs 100. It will be assumed herein that CMM 100 is a portable CMM that can be readily transported and set-up where needed.

Prior to describing off-line GUI system 10, the Essential features and attributes of CMM 100 will be described. A hand-held and manipulated probe 102 is used to make contact with selected points on objects (not shown) to be measured. Probe 102 is "coupled" (e.g., mechanically, electrically in a hardwire or wireless fashion, and/or optically) to a probe operations support 104 and a processor 106 where the dashed coupling line is representative of a variety of types of physical and/or communication couplings. For example, operations support 104 could be an articulating arm having a fixed base with probe 102 being attached to the outboard end of the articulating arm. In this example, probe 102 is hardwired to processor 106 via wiring in operations support 104. Probe 102 could also be a free-standing ball whose position is read by optical beams in line-of-sight with probe 102. In this example, operations support 104 is indicative of optical beam sources placed in line-of-sight communication with probe 102 with the optical beam sources, in turn, being coupled to processor 106 in a hardwired or wireless fashion. Accordingly, it is to be understood that the particular structure of probe 102 and operations support 104 are not limitations of the present invention.

As mentioned above, CMM 100 also includes processor 106 that is programmed with the metrology software used to control and interpret movements and touches of probe 102. Briefly and is known in the art, such metrology software defines a three-dimensional coordinate space and knows the exact position of probe 102 in this coordinate space as probe 102 moves therein. In this way, each time processor 106 records a probe touch, the touched point is precisely defined in the metrology's coordinate space.

CMM further typically includes at least two peripheral devices, i.e., input control 108 and a display 110. Input control 110 can include a keyboard, a mouse, and/or any other user-operated control that can provide user inputs to processor 106. These user inputs are used to control the metrology software to include selecting the operational mode of probe 102. Choices and constructions for input control 108 are well understood in the art. Similarly, display 110 can be any display on which a user can view current operational modes of probe 102, images generated by the metrology software, measurement and/or calibration data, etc.

Figure 2:
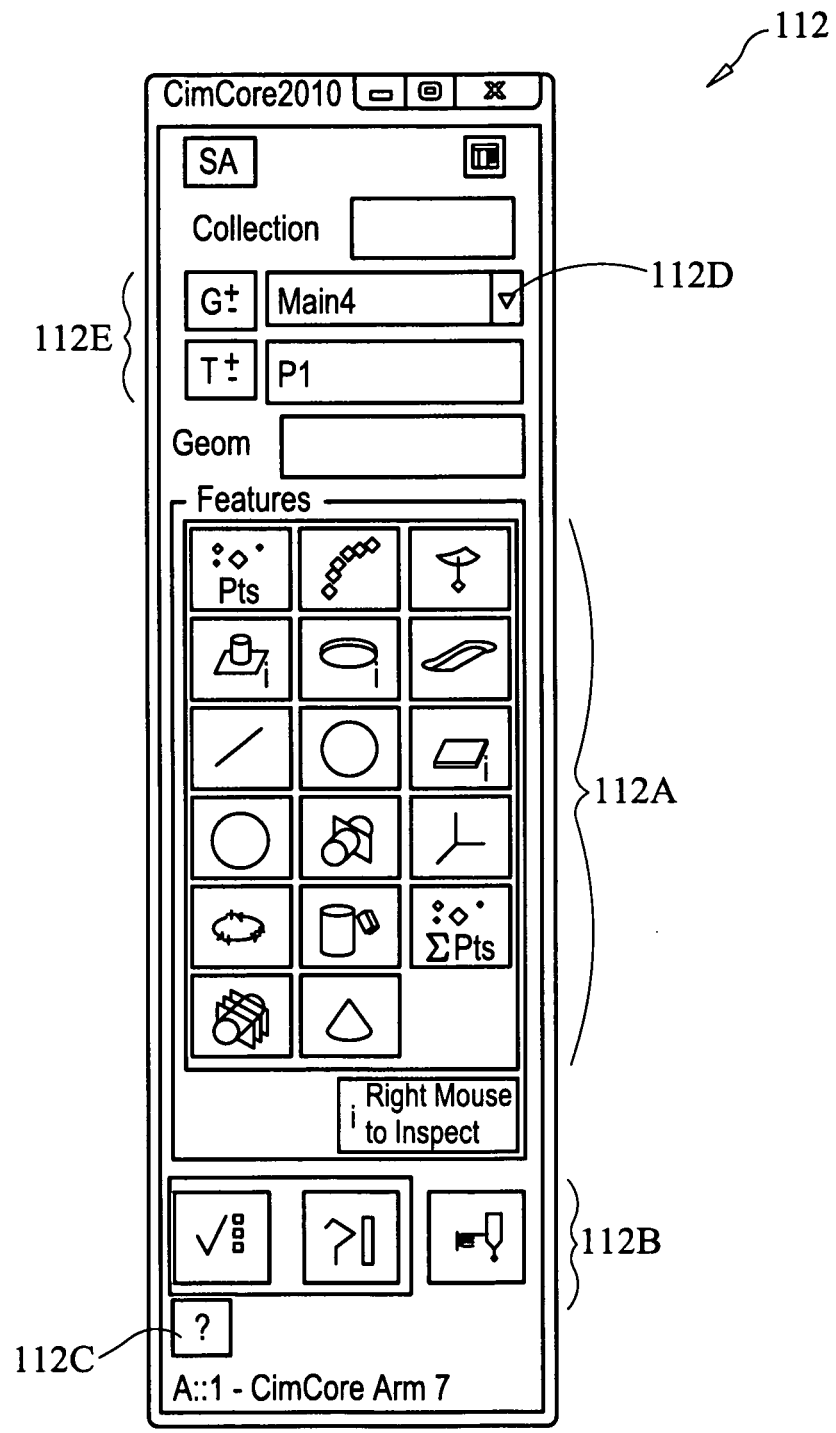
FIG. 2 is an image of a typical GUI displayed on a CMM's monitor.

Typically, one of the items displayed on display 110 is a GUI 112. In terms of CMM 100, GUI 112 presents an image of the various operational modes of probe 102 as well as other routines that can be performed with the metrology software on processor 106. By way of illustration, the image of an exemplary GUI 112 is illustrated in FIG. 2 where various probe operational icons or "buttons" 112A are presented, various option/calibration buttons 112B are presented, a HELP button 112C is presented, a drop down menu button 112D is presented, and toggle buttons 112E are presented. It is to be understood that this GUI layout and its control operation buttons are not limitations of the present invention as more or fewer control options/operations could be presented thereby.

Referring again to FIG. 1, the conventional way of selecting an operational mode for a probe 102 is for input control 108 to "select" a button displayed on GUI 112 whereby processor 106 causes probe 102 to be placed in the selected mode. In terms of a single operator, such operation generally requires the operator to set down probe 102 and operate input control 108. The present invention eliminates the need for an operator to use input control 108. That is, an off-line GUI system 10 in accordance with the present invention allows an operator to use probe 102 for CMM operations and for CMM control.

Off-line GUI system 10 includes at least one off-line GUI image 12 and a controller 14. For simplicity of illustration, only one off-line GUI image 12 is shown. However, one or more additional off-line GUI images (not shown) could also be provided where each off-line GUI image could present a unique set of controls/operations for CMM 100, or could present a set of control/operations associated with a different CMM. The term "off-line" as used herein means passive or inert with respect to signal generation, transmission or reception. That is, each GUI image 12 in the present invention is nothing more than a two or three-dimensional graphical image presentation. In terms of the present invention, each GUI image 12 presents a number of icons, each of which is associated with some function of CMM 100. For example, GUI image 12 could mimic the presentation of icons used for GUI 112. However, GUI image 12 is not so limited as it could present more or fewer icons (as compared to GUI 112) without departing from the scope of the present invention.

Controller 14 carries out a number of functions for system 10. For simplicity of description, these functions are broken out as modules within controller 14. However, it is to be understood that the various modules may not be so clearly delineated in actual practice. It is further to be understood that controller 14 could be inclusive of separate hardware that is interfaced with processor 106 of CMM 100, but could also be incorporated in the hardware defining processor 106. That is, controller 14 and its functions could be incorporated into the hardware structure of CMM 100 without departing from the scope of the present invention.

The basic functions provided by controller 14 include module 140 for locating off-line GUI image 12, module 142 for defining coordinates of off-line GUI image 12, module 144 for defining control zones for each of the icons presented in GUI image 12, and module 146 or defining function activation zones for each of the icons presented in GUI image 12. Each of the modules will be described briefly below with more details being provided later herein during the operational description of system 10.

Module 140 essentially invokes and uses the coordinate measurement function of CMM 100 to locate GUI image 12 in the coordinate space of CMM 100. As will be explained further below, module 140 could also be used to identify the type of off-line GUI image 12 being located. For example, when system 10 has multiple unique off-line GUI images associated therewith, module 140 could also be used to identify the particular off-line GUI image and its icons. Module 142 defines the "local" coordinates of the various icons presented by GUI image 12 where the local coordinates are then referenced or converted to coordinates in the coordinate space of CMM 100. Module 144 defines three-dimensional spatial zones associated with each of the icons presented by GUI image 12 that, when entered by probe 102, identify a particular operational mode of CMM 100 to processor 106. Finally, module 146 defines a function activation zone within each of the spatial zones defined by module 144 where each function activation zone defines criteria related to movement of probe 102 therein. When this specified movement is performed by probe 102, processor 106 implements the particular operational mode associated with the spatial zones' icon.

Figure 3:
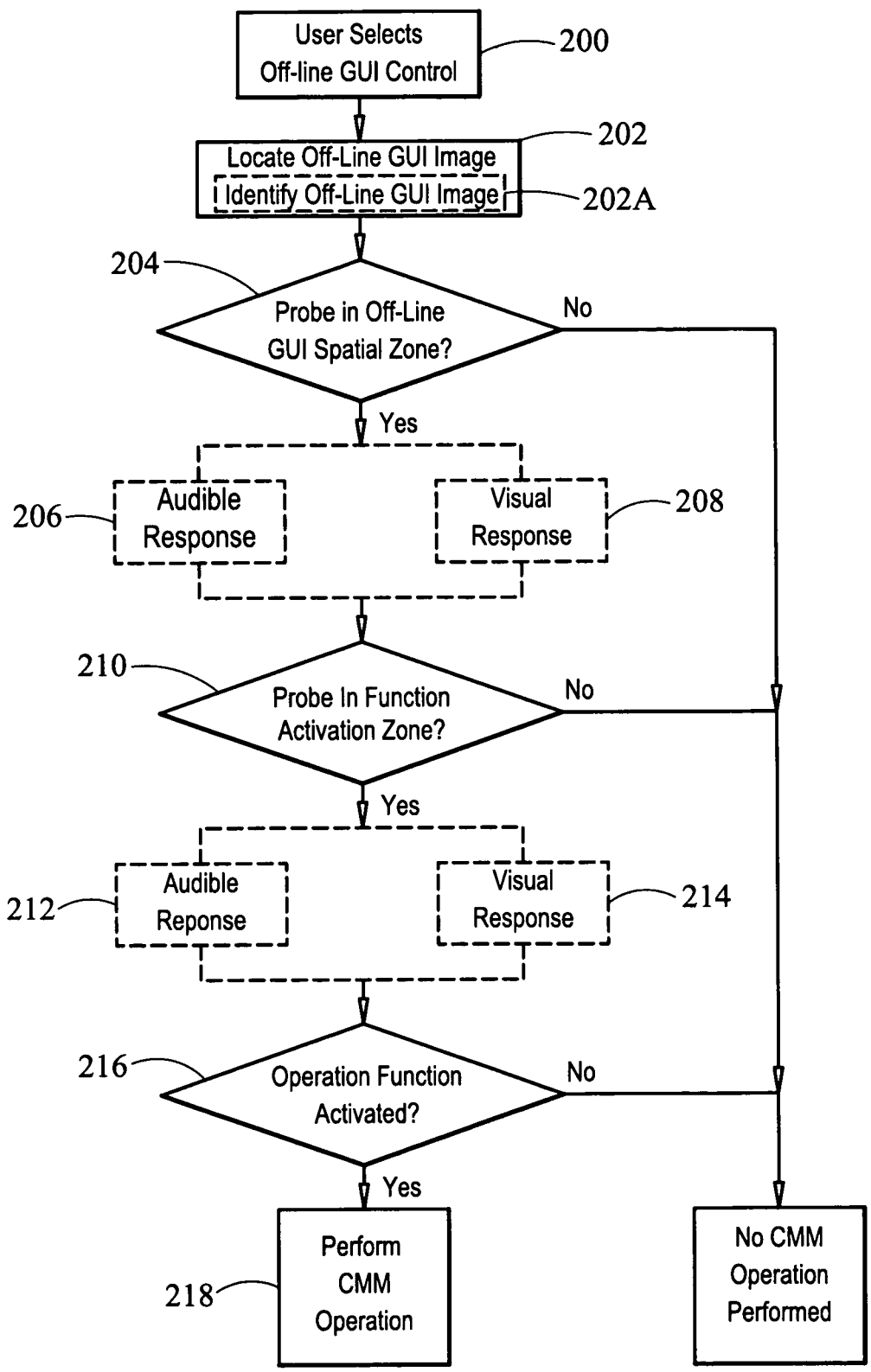
FIG. 3 is a flow diagram of the process steps used to carry out the off-line GUI method for use with a CMM in accordance with an embodiment of the present invention.
Figure 4:
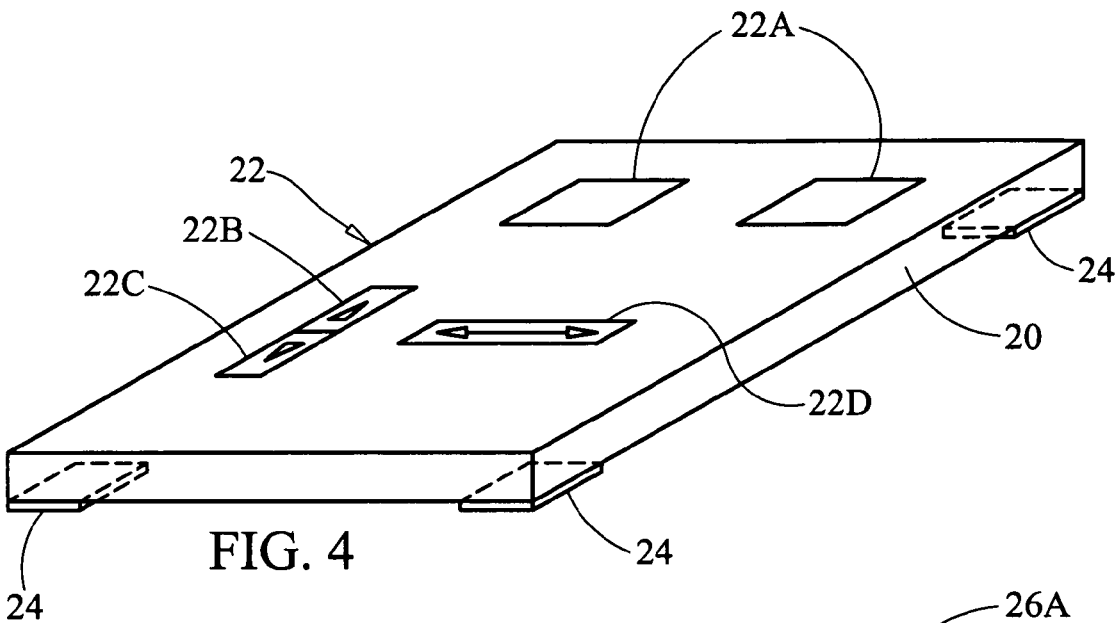
FIG. 4 is a perspective view of an off-line GUI image displayed on a platform in accordance with an embodiment of the present invention.

Operation of off-line GUI system 10 in accordance with an embodiment of the present invention will now be described with the aid of FIGS. 3-6. Referring first to FIG. 3, a flow diagram of a series of process steps implemented by system 10 in accordance with an embodiment thereof is presented. At step 200, a user of CMM 100 actively or passively selects off-line GUI image control in accordance with the present invention. For example, active selection could involve user-toggling of a control button presented on GUI image 112 (FIG. 1) where such action indicates to processor 106 that the user will next be locating off-line GUI image 12 in the coordinate space of CMM 100. Then, the user proceeds to step 202 where CMM 100 is used to locate off-line image 12. While this step is generally known in the art of CMM, one way of effecting this operation will be explained later herein. Further, in the case where system 10 has multiple and unique off-line GUI images associated therewith, step 202 can include an optional step 202A of automatically identifying the particular off-line GUI image (and its particular icons) as it is being located. One way of achieving this will be described later below.

Passive implementation of step 200 could simply be keyed to locating GUI image 12 where such action places GUI image 12 in the coordinate space of CMM 100 and automatically makes modules 142, 144 and 146 available to processor 106. Also, note that off-line GUI control in accordance with the present invention need not be exclusive. That is, off-line GUI control could be invoked with conventional input control 108 remaining active if needed.

Once off-line GUI image 12 has been located in the coordinate space of CMM 100, modules 142, 144 and 146 allow system 10 to provide GUI control of CMM 100 using probe 102 and GUI image 12. Such control will be explained with additional reference to FIGS. 4-6 where an exemplary off-line GUI image 22 is a two-dimensional image of control operation icons/buttons presented on a platform 20. By way of illustration, GUI image 22 presents two push button icons 22A, a scroll up icon 22B, a scroll down icon 22C, and a gesturing or leafing icon 32D. Additional, fewer, and/or different types of control operation icons can be presented without departing from the scope of the presented invention. Platform 20 can be flexible (e.g., paper, cardboard, rubber, etc.) or rigid (e.g., wood, metal, plastic, composite, etc.) without departing from the scope of the present invention. Platform 20 can also include attachment devices 24 (e.g., adhesive strips, VELCRO strips, magnets, etc.) that facilitate the temporary or permanent fixing of platform 20 to a surface (not shown).

Figure 5A:
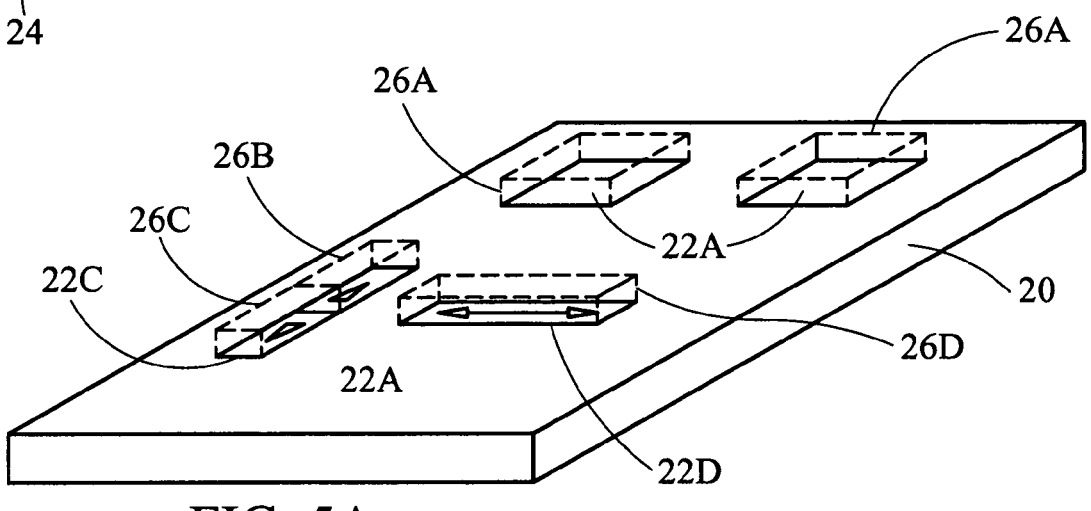
FIG. 5A is a perspective view of the GUI image in FIG. 4 illustrating the spatial operation zones defined over each control operation icon depicted thereon in accordance with an embodiment of the present invention.
Figure 5B:
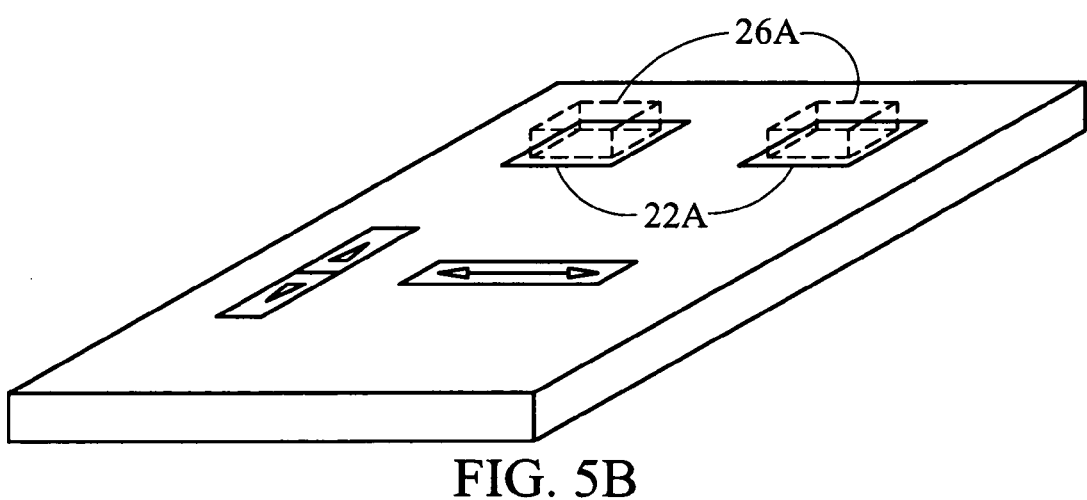
FIG. 5B is a perspective view of the GUI image in FIG. 4 illustrating the spatial operation zones defined over each control operation icon depicted thereon in accordance with another embodiment of the present invention.

Since GUI image 22 is located by CMM 100 and since module 142 defines the local coordinates of icons 22A-22D (i.e., the relative positions of the icons on GUI image 22), the icons are readily referenced to the coordinate space of CMM 100 by processor 106. That is, the two-dimensional footprint of each icon is located in the coordinate space of CMM 100. In accordance with the present invention, each of icons 22A-22D is further defined in a third dimension also referenced to the CMM's coordinate space to thereby define a volumetric or spatial zone in the CMM's coordinate space as illustrated in FIGS. 5A and 5B. For example, the spatial zones 26A-26D corresponding to icons 22A-22D, respectively, could simply be three-dimensional extensions of each icons' two-dimensional print as illustrated in FIG. 5A. However, the present invention is not so limited as the three-dimensional extensions could occupy a smaller footprint than their icon's two-dimensional footprint as illustrated for spatial zones 26A in FIG. 5B. Other shapes for the spatial zones could also be used without departing from the scope of the present invention.

Using the above-described structure and definitions of GUI image 12, the present method continues with step 204 (FIG. 3) where CMM 100 determines if probe 102 is in one of spatial zones 26A-26D. If not, no CMM operation is performed. However, if CMM 100 determines that probe 102 is in one of spatial zones 26A-26D, probe 102 is positioned to place CMM 100 in the operational mode defined by the icon associated with the spatial zone. Entry into an icon's spatial zone could be used to trigger one or more responses such as an audible response 206 (e.g., tone, speech identifying the control operation associated with the icon, etc.) and/or a visual response 208 (e.g., separate light display, highlighting of the corresponding icon on GUI image 112, etc.). Accordingly, system 10 can also include one or more output device(s) 16 to generate the audible and/or visual response when CMM 100 determines that probe 102 is in one of spatial zones 26A-26D. The optional nature of responses 206 and 208 is indicated in FIG. 3 by the dashed line illustrations thereof.

Figure 6:
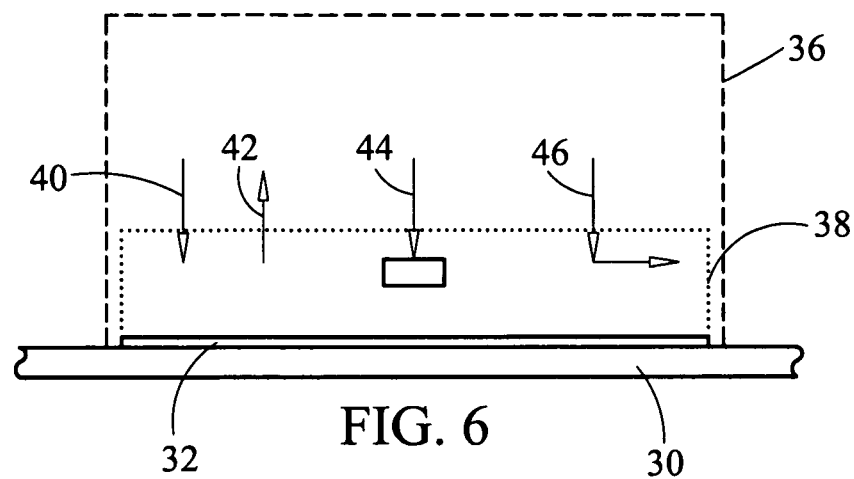
FIG. 6 is a side view of a portion of a GUI image's control operation icon with the icon's spatial operation zone and its inclusive function activation zone defined immediately adjacent to the icon in accordance with an embodiment of the present invention.

Prior to explaining the next step in the present invention, reference will be made to FIG. 6 where a single icon 32 is presented on a surface of platform 30. The spatial zone associated with icon 32 is referenced by dashed lines 36. In addition, a function activation zone (defined by module 146) associated with icon 32 is referenced by dotted lines 38. Function activation zone 38 is generally a smaller spatial zone that fits within spatial zone 36 and is immediately adjacent to icon 32. The coordinates of zone 38 are defined locally by module 146 and are referenced to the coordinate space of CMM 100 when the off-line GUI image incorporating icon 32 is located. Function activation zone 38 defines the type of probe movement that is required to activate the control operation mode indentified by icon 32. By way of example, three types of probe movement criteria are illustrated in FIG. 6. Up/down arrows 40/42 are indicative of "push button" criteria where probe 102 must enter zone 38 and then leave it shortly thereafter. Arrow-to-block 44 is indicative of a "push-and-hold" criteria where probe 102 enters zone 38 and remains there as long as a user wants an operation (e.g., a scrolling operation) to continue. Arrow-in-and-over sequence 46 is indicative of a gesturing or leafing criteria where probe 102 enters zone 38 and is moved (e.g., left or right) therein to cause a leafing or paging operation. It is to be understood that other types of probe movement criteria could be used without departing from the scope of the present invention.

Referring again to FIG. 3, step 210 of the process determines if probe 102 has entered the particular function actuation zone 38. If not, no CMM operation is performed. If the probe is in the function activation zone, one or both of an audible response 212 and visual response 214 can be generated. Finally, at step 216, the process determines if probe 102 has performed the requisite movement thereof within the particular function activation zone 38. If not, no CMM operation is performed. If the requisite probe movement has been performed, the CMM will enter the prescribed operational mode and/or perform the prescribed task. Audible and/or responses could also be provided to indicate this result, however, the user will typically be able to see that this has occurred as the action will be visible on display 110 of CMM 100.

Figure 7:
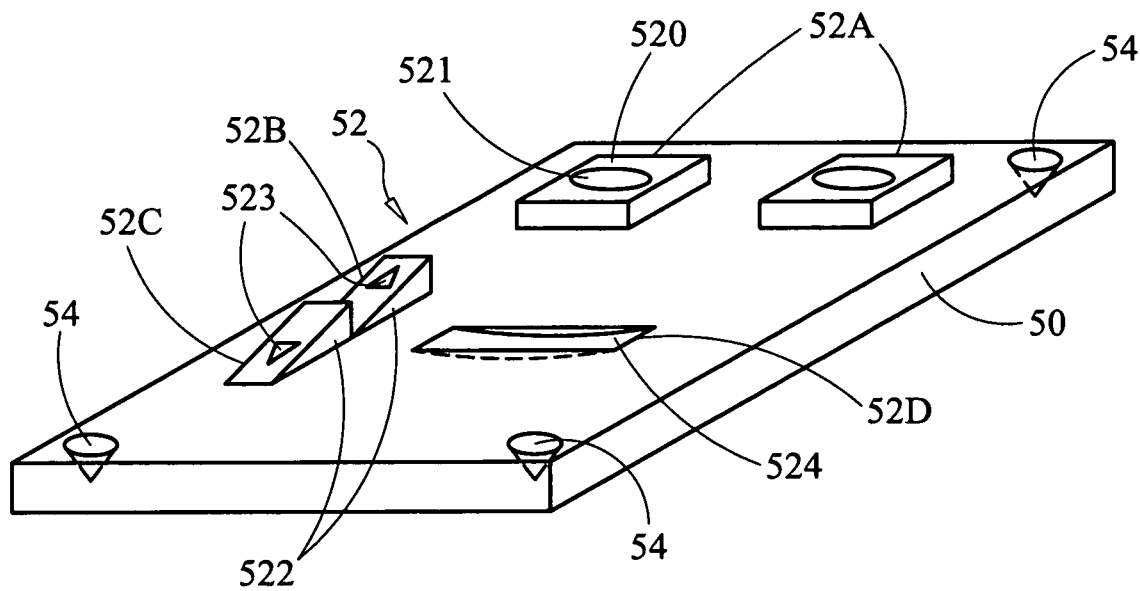
FIG. 7 is a perspective side view of an off-line GUI image displayed three-dimensionally on a platform to include reference positions used by a CMM to locate the off-line GUI image.

As mentioned above, an off-line GUI image in accordance with the present invention can be presented in two or three dimensions. Further, as also mentioned above, locating an off-line GUI image can be facilitated in the present invention when reference positions are provided on the GUI image. Accordingly, FIG. 7 illustrates a GUI image 52 in which each icon 52A-52D is presented in three dimensions on a platform 50 and in which three reference positions 54 are also presented in three dimensions. The shapes shown are exemplary as it is to be understood that the particular geometric shapes of the icons and reference positions are not limitations of the present invention.

Figure 8:
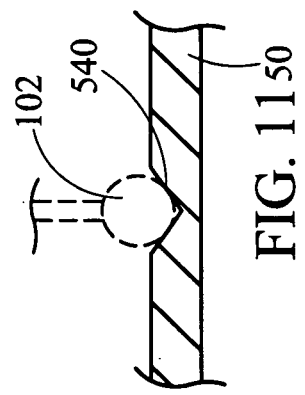
FIG. 8 is an isolated cross-sectional view of a three-dimensional button icon and its spatial operation zone in accordance with an embodiment of the present invention.

Push button icons 52A (one of which is shown in cross-section in FIG. 8) are defined by a body 520 extending up from platform 50 with a depression 521 formed in body 520. Depression 521 forms a target or cradle for the tip of probe (not shown) when a user is selecting the operation associated with one of icons 52A. The surface of depression 521 could be uniquely colored or have the operation printed thereon. Further, body 520 could be made from an elastic material so a user could receive tactile feedback when pressing on it with probe 102. Still further, while the spatial zone 56 (i.e., analogous to spatial zone 36 described above) could extend to the periphery of icon 52A, the icon's function activation zone 58 (i.e., analogous to function activation zone 38 described above) could be limited to a volumetric region above depression 521 as shown in FIG. 8 to thereby encourage user precision when selecting this icon.

Figure 9:
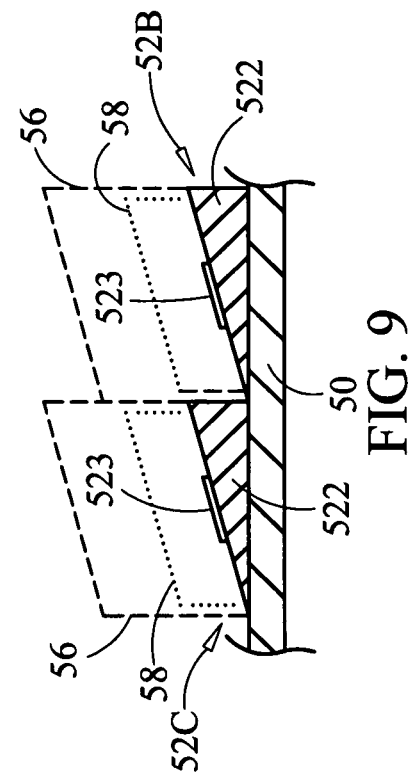
FIG. 9 is an isolated cross-sectional view of a three-dimensional scrolling icon and its spatial operation zones in accordance with an embodiment of the present invention.

Scroll button icons 52B and 52C (also shown in cross-section in FIG. 9) are each defined by a wedge-shaped body 522 formed on platform 50. Arrow indicia 523 can be printed on each body 522, or could be depressed into 522 similar to the way depression 521 is formed in body 520. Each body 522 could also be made from an elastic material. Exemplary spatial zones 56 and function activation zones 58 are also illustrated in FIG. 9.

Figure 10:
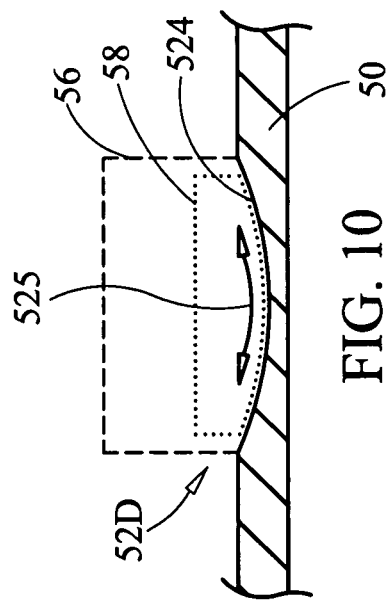
FIG. 10 is an isolated cross-sectional view of a three-dimensional gesturing icon and its spatial operation zone in accordance with an embodiment of the present invention.

Gesturing or leafing icon 52D (also shown in cross-section in FIG. 10) is defined by a crescent-shaped trough 524 formed in platform 50. Note that icon 52D could also be constructed similar to icons 52A where a body would extend up from platform 50 and trough 524 would be formed in the body. The surface of trough 524 will generally be smooth to facilitate movement of CMM's probe (not shown) thereon. Movement of the probe to generate the leafing operation could be, for example, to the left or right as indicated by two-headed arrow 525 within function activation zone 58.

Figure 11:
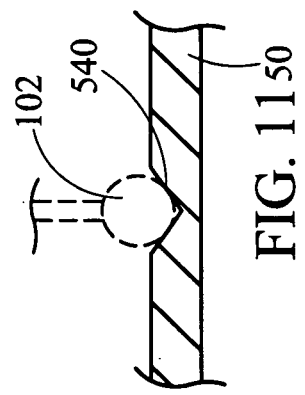
FIG. 11 is an isolated cross-sectional view of a conical depression used to define a reference position in accordance with an embodiment of the present invention.

As described above, a first step in the process of the present invention is to locate the off-line GUI image, i.e., step 202 in FIG. 3. As is known in the art of CMM's, an object's location is determined by recognizing multiple points thereon. Assuring accuracy in the locating of the off-line GUI image will assure the accuracy with which the control operation icons are defined within the coordinate space of the CMM. One way of achieving high accuracy in the locating process is to provide at least three non-collinearly arranged reference positions. Accordingly, FIG. 7 illustrates three distinct reference positions 54 distributed on GUI image 52. Positions 54 are non-collinear and are non-coincident with any icons on GUI image 52. Positions 54 could be presented as two-dimensional images (e.g., a cross-hair). To provide a greater degree of user confidence that reference positions 54 have been accurately located, reference positions 54 can be formed as depressions designed to partially receive the CMM's probe. For example, FIG. 11 illustrates a conical depression 540 formed in platform 50 for one of reference positions 54. Depression 540 is sized/shaped such that probe 102 can be partially received therein while fully contacting an annular region of depression 540. In this way, an operator knows that when probe 102 "bottoms out" in depression 540, probe 102 has accurately located reference position 54.

A particular arrangement of reference positions 54 could also be used to identify the particular off-line GUI image (and the icons presented thereby) to system 10. That is, each unique off-line GUI image could have a unique set of reference positions 54 associated therewith so that locating step 202 (FIG. 3) automatically invokes or incorporates identifying step 202A described above. In this way, system 10 knows which off-line GUI image will govern control/operations of system 10.

Figure 12:
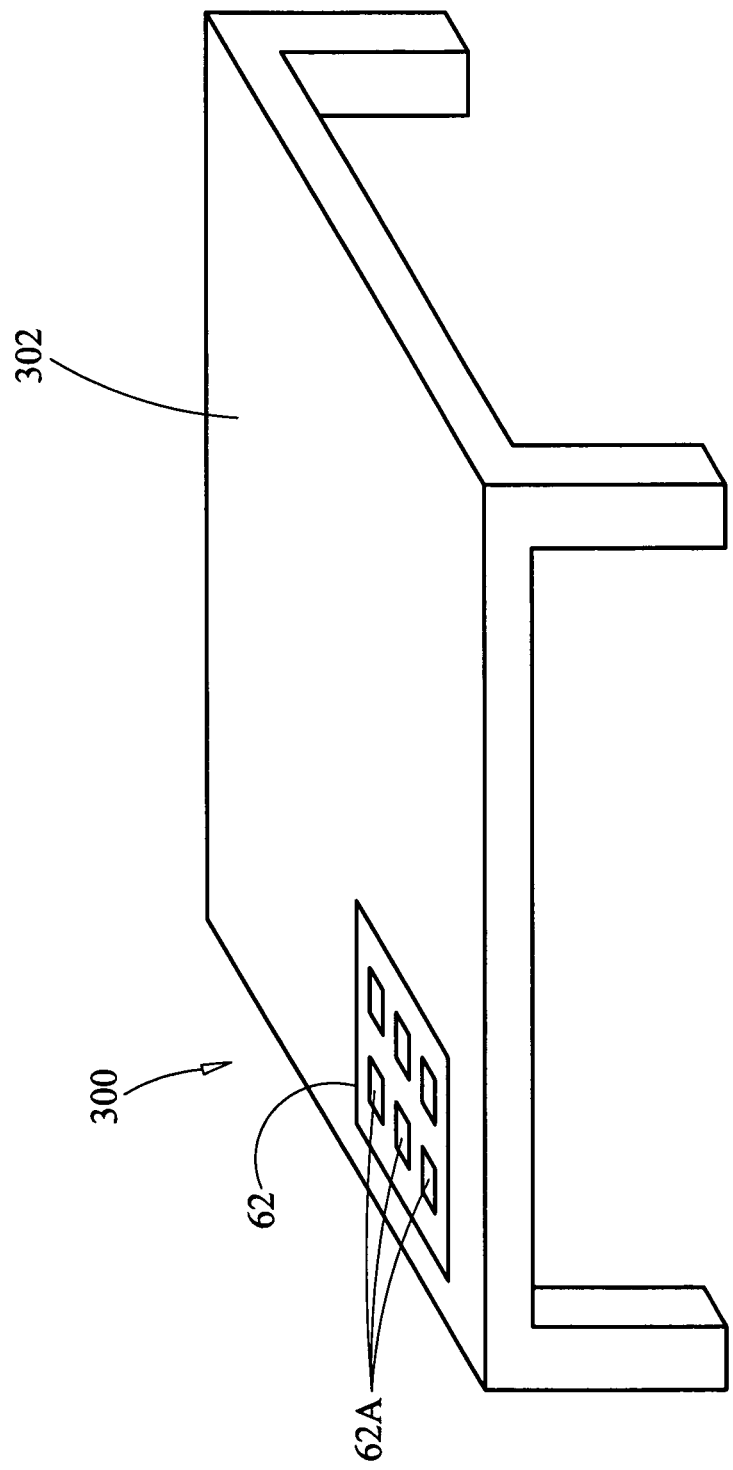
FIG. 12 is a perspective view of a measurement table used for CMM measurements with an off-line GUI image applied to the table's work surface.

One of the great advantages of the present invention is the portability of the off-line GUI image and ease with which it can be placed where needed. However, the present invention is not so limited as the off-line GUI image could also be permanently incorporated into/onto a work station. For example, FIG. 12 illustrates a table 300 with a work surface 302 defined thereby. Printed, painted or otherwise applied to surface 302 is an off-line GUI image 62 presenting a number of icons 62A thereon. In this embodiment, the "platform" for the GUI image is formed by the print image media. Note that the off-line GUI image could also be permanently constructed in three dimensions on surface 302 without departing from the scope of the present invention.

The advantages of the present invention are numerous. An operator of a portable CMM can greatly improve his metrology efficiency since the operator can use the CMM's probe to also control operational modes of the CMM. The off-line GUI image is inexpensive and can be readily customized for a particular application. The system and method take advantage of the CMM's inherent operations to place operator control of the CMM at a location that best suits the particular operator and particular metrology application.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An off-line graphical user interface (GUI) system for input control of a three-dimensional coordinate measuring machine (CMM) using the CMM's probe, comprising:
   a passive physical representation of a GUI image existing in at least two dimensions, said passive physical representation of a GUI image presenting a plurality of control operation icons associated with the CMM, each of said control operation icons being indicative of an operational function of the CMM; and
   a central processing unit (CPU) programmed to carry out a plurality of functions, said CPU adapted to interface with the CMM, said CPU using the CMM to locate said passive physical representation of a GUI image in a coordinate system of the CMM;
   said functions including defining coordinates of said control operation icons,
   referencing said coordinates to the coordinate system of the CMM,
   defining, for each of said control operation icons, a respective three-dimensional spatial zone corresponding uniquely to each of said control operation icons, each said spatial zone extending from one of said control operation icons associated therewith, each said spatial zone referenced to the coordinate system of the CMM and identifying, for said CPU, the operational function of the CMM associated with said one of said control operation icons, and
   defining, for each said spatial zone, a respective three-dimensional function activation zone that is volumetrically smaller than and disposed within each said spatial zone, each said function activation zone defining one of a plurality of specific movements of the CMM's probe within said function activation zone required to activate the operational function of the CMM associated with one of said control operation icons corresponding thereto, wherein only satisfaction of said one of said plurality of specific movements causes the operational function of the CMM to be carried out by the CMM.

2. A system as in claim 1, wherein said passive physical representation of a GUI image exists in three dimensions.

3. A system as in claim 1, wherein said passive physical representation of a GUI image further visually presents at least three reference positions, each of said reference positions located on said passive physical representation of a GUI image in an area thereof not coincident with said control operation icons, said at least three reference positions being non-collinear.

4. A system as in claim 3, wherein each of said reference positions comprises a three-dimensional feature.

5. A system as in claim 3, wherein each of said reference positions comprises a depression in said passive physical representation of a GUI image that is adapted to at least partially receive the CMM's probe therein.

6. A system as in claim 1, wherein said CPU generates a first signal whenever the CMM's probe enters each said spatial zone, and wherein said CPU generates a second signal whenever the CMM's probe enters each said function activation zone.

7. A system as in claim 6, further comprising at least one output device coupled to said CPU, wherein said first signal is applied to said at least one output device to produce a first sensory output, and wherein said second signal is applied to said at least one output device to produce a second sensory output that is different from said first sensory output.

8. A system as in claim 7, wherein at least one of said first sensory output and said second sensory output comprises a speech output.

9. A system as in claim 1, wherein said plurality of specific movements of the CMM's probe includes movement of the CMM's probe into and then out of said function activation zone within a predetermined period of time, movement of the CMM's probe into said function activation zone and retention therein, and movement of the CMM's probe into said function activation zone and subsequent movement therein.

10. A system as in claim 1, wherein said passive physical representation of a GUI image comprises image media adapted to be applied on a surface.

11. A system as in claim 1, wherein said passive physical representation of a GUI image is portable.

12. A system as in claim 1, wherein said passive physical representation of a GUI image is flexible.

13. A system as in claim 1, further comprising an attachment device coupled to said passive physical representation of a GUI image and adapted to be coupled to a surface, wherein said passive physical representation of a GUI image is fixed in position relative to the surface.

14. An off-line graphical user interface (GUI) system for input control of a three-dimensional coordinate measuring machine (CMM) using the CMM's probe, comprising:

a passive physical representation of a GUI image existing in at least two dimensions, said passive physical representation of a GUI image presenting a plurality of control operation icons associated with the CMM, each of said control operation icons being indicative of an operational function of the CMM, said passive physical representation of a GUI image visually presenting at least three reference positions, each of said reference positions located on said passive physical representation of a GUI image in an area thereof not coincident with said control operation icons, said at least three reference positions being non-collinear; and a central processing unit (CPU) programmed to carry out a plurality of functions, said CPU adapted to interface with the CMM, said controller using the CMM to locate said passive physical representation of a GUI image in a coordinate system of the CMM using said at least three reference positions, said functions including defining coordinates of said control operation icons;

referencing said coordinates to the coordinate system of the CMM;

defining a three-dimensional spatial zone corresponding uniquely to each of said control operation icons, each said spatial zone bounded in two dimensions by one of said control operation icons associated therewith, each said spatial zone extending in a third dimension from said one of said control operation icons associated therewith and identifying, for said CPU, the operational function of the CMM associated with said one of said control operation icons, wherein said two dimensions and said third dimension are referenced to the coordinate system of the CMM; and defining a three-dimensional function activation zone that is volumetrically smaller than and disposed within each said spatial zone and adjacent to one of said control operation icons associated therewith, each said function activation zone defining one of a plurality of specific movements of the CMM's probe within said function of the CMM associated with one of said control operation icons corresponding thereto, wherein only satisfaction of said one of said plurality of specific movements causes the operational function of the CMM to be carried out by the CMM.

15. A system as in claim 14, wherein said passive physical representation of a GUI image exists in three dimensions.

16. A system as in claim 14, wherein each of said reference positions comprises a three-dimensional feature.

17. A system as in claim 14, wherein each of said reference positions comprises a depression in said passive physical representation of a GUI image that is adapted to at least partially receive the CMM's probe therein.

18. A system as in claim 14, wherein said CPU generates a first signal whenever the CMM's probe enters each said spatial zone, and wherein said controller generates a second signal whenever the CMM's probe enters each said function activation zone.

19. A system as in claim 18, further comprising at least one output device coupled to said CPU, wherein said first signal is applied to said at least one output device to produce a first sensory output, and wherein said second signal is applied to said at least one output device to produce a second sensory output that is different from said first sensory output.

20. A system as in claim 19, wherein at least one of said first sensory output and said second sensory output comprises a speech output.

21. A system as in claim 14, wherein said plurality of specific movements of the CMM's probe includes movement of the CMM's probe into and then out of said function activation zone within a predetermined period of time, movement of the CMM's probe into said function activation zone and retention therein, and movement of the CMM's probe into said function activation zone and subsequent movement therein.

22. A system as in claim 14, wherein said passive physical representation of a GUI image comprises image media adapted to be applied on a surface.

23. A system as in claim 14, wherein said passive physical representation of a GUI image is portable.

24. A system as in claim 14, wherein said passive physical representation of a GUI image is flexible.

25. A system as in claim 14, further comprising an attachment device coupled to said passive physical representation of a GUI image and adapted to be coupled to a surface, wherein said passive physical representation of a GUI image is fixed in position relative to the surface.

26. A method of controlling a three-dimensional coordinate measuring machine (CMM) using the CMM's probe and an off-line graphical user interface (GUI), comprising the steps of:
    providing a passive physical representation of a GUI image in at least two dimensions, said passive physical representation of a GUI image presenting a plurality of control operation icons associated with the CMM, each of said control operation icons being indicative of an operational function of the CMM;
    defining coordinates of said control operation icons;
    locating said passive physical representation of a GUI image in a coordinate system of the CMM using the CMM's probe;
    referencing said coordinates of said control operation icons to the coordinate system of the CMM;
    defining a three-dimensional spatial zone corresponding uniquely to each of said control operation icons, each said spatial zone extending from one of said control operation icons associated therewith, each said spatial zone referenced to the coordinate system of the CMM and identifying, for said CPU, the operational function of the CMM associated with said one of said control operation icons;
    defining a three-dimensional function activation zone that is volumetrically smaller than and disposed within each said spatial zone, each said function activation zone defining one of a plurality of specific movements of the CMM's probe within said function activation zone required to activate the operational function of the CMM associated with one of said control operation icons corresponding thereto;
    positioning the CMM's probe in a selected one said Function activation zone; and
    moving the CMM's probe within said selected one said function activation zone in accordance with said one of said specific movements associated therewith, wherein only satisfaction of said one of said specific movements causes the operational function of the CMM associated with one of said control operation icons corresponding thereto to be carried out by the CMM.

27. A method according to claim 26, wherein passive physical representation of a GUI image exists in three dimensions.

28. A method according to claim 26, wherein said passive physical representation of a GUI image further visually presents at least three reference positions, each of said reference positions located on said passive physical representation of a GUI image in an area thereof not coincident with said control operation icons, said reference positions being non-collinear, and wherein said step of locating includes the steps of:
    positioning the CMM's probe at one of said reference positions;
    recording a location of the CMM's probe so-positioned within the coordinate system of the CMM; and
    repeating said steps of positioning and recording for a remainder of said reference positions.

29. A method according to claim 28, wherein said step of locating includes the step of identifying said plurality of control operation icons associated with said passive physical representation of a GUI image using said reference positions.

30. A method according to claim 28, wherein each of said reference positions comprises a three-dimensional feature.

31. A method according to claim 28, wherein each of said reference positions comprises a depression in said passive physical representation of a GUI image that is adapted to at least partially receive the CMM's probe therein.

32. A method according to claim 26, further comprising the steps of:
    generating a first signal whenever the CMM's probe enters each said spatial zone; and
    generating a second signal whenever the CMM's probe enters each said function activation zone.

33. A method according to claim 32, further comprising the steps of:
    converting said first signal to a first sensory output; and
    converting said second signal to a second sensory output that is different from said first sensory output.

34. A method according to claim 33, wherein at least one of said first sensory output and said second sensory output comprises audible speech.

35. A method according to claim 26, wherein said plurality of specific movements of the CMM's probe includes movement of the CMM's probe into and then out of said function activation zone within a predetermined period of time, movement of the CMM's probe into said function activation zone and retention therein, and movement of the CMM's probe into said function activation zone and subsequent movement therein.

36. A method according to claim 26, wherein said passive physical representation of a GUI image comprises image media, and wherein said step of providing comprises the step of applying said image media to a surface.

\* \* \* \* \*